United States Patent
Molina

(10) Patent No.: US 11,209,156 B2
(45) Date of Patent: Dec. 28, 2021

(54) SYSTEMS AND METHODS FOR A DETACHABLE LIGHTING ACCESSORY FOR A POWER TOOL

(71) Applicant: Gerardo Molina, Brazoria, TX (US)

(72) Inventor: Gerardo Molina, Brazoria, TX (US)

( * ) Notice: Subject to any disclaimer, the term of this patent is extended or adjusted under 35 U.S.C. 154(b) by 60 days.

(21) Appl. No.: 16/561,788

(22) Filed: Sep. 5, 2019

(65) Prior Publication Data

US 2020/0318828 A1    Oct. 8, 2020

Related U.S. Application Data

(60) Provisional application No. 62/718,448, filed on Aug. 14, 2018.

(51) Int. Cl.

| | | |
|---|---|---|
| *F21V 33/00* | (2006.01) | |
| *B25B 23/18* | (2006.01) | |
| *B23Q 17/24* | (2006.01) | |
| *B25F 5/02* | (2006.01) | |
| *B25B 21/00* | (2006.01) | |

(52) U.S. Cl.
CPC ...... *F21V 33/0084* (2013.01); *B23Q 17/2404* (2013.01); *B25B 21/007* (2013.01); *B25B 23/18* (2013.01); *B25F 5/021* (2013.01)

(58) Field of Classification Search
CPC ........... F21V 33/0084; F21L 4/02; F21L 4/04; B25B 23/18
See application file for complete search history.

(56) References Cited

U.S. PATENT DOCUMENTS

| | | |
|---|---|---|
| 5,168,780 A | 12/1992 | Van Gennep |
| 5,845,986 A | 12/1998 | Breen |
| 6,713,905 B2 | 3/2004 | Hirschburger et al. |
| 6,979,155 B2 | 12/2005 | Dils et al. |
| 7,992,311 B2 | 8/2011 | Cerwin |
| 9,328,915 B2 | 5/2016 | Vanko et al. |
| 9,933,152 B1* | 4/2018 | Cannon .................. B25B 27/00 |
| 2002/0105796 A1* | 8/2002 | Naghi ................. F21V 33/0084 362/120 |
| 2010/0053940 A1 | 3/2010 | Yaksich |
| 2011/0188232 A1 | 8/2011 | Friedman et al. |
| 2012/0328381 A1 | 12/2012 | Schmidt et al. |
| 2015/0159847 A1* | 6/2015 | Galli ......................... F41G 1/35 362/111 |
| 2017/0113335 A1 | 4/2017 | Taullaj |
| 2017/0167721 A1* | 6/2017 | Padget .................... B25B 23/18 |
| 2018/0126538 A1* | 5/2018 | Qiu ....................... G02B 6/0021 |

OTHER PUBLICATIONS

Amazon product page for the ThruNite Ti3 V2 CW published at least by Aug. 27, 2016 and available at https://www.amazon.com/ThruNite-Ti3-Max120-Lumens-Flashlight/dp/B00LUO028U?th=1. (Year: 2016).*

(Continued)

*Primary Examiner* — Blake A Tankersley
(74) *Attorney, Agent, or Firm* — Pierson Intellectual Property LLC

(57) ABSTRACT

A power tool with a removable lighting accessor that is configured to be inserted into a compression sleeve, wherein the lighting attachment may be inserted and rotated without removing a working end of the power tool.

7 Claims, 6 Drawing Sheets

(56) References Cited

OTHER PUBLICATIONS

YouTube video titled "Improvised AR-15 Backup Flashlight" by Survivalkraft, published on Jan. 21, 2016, and available at https://www.youtube.com/watch?v=sb2SnGStFvw. (Year: 2016).*

Amazon customer review of the Ti3 V2 CW titled "Nice little 'AAA' flashlight" by MidAtlanticTV, published on Aug. 19, 2015, and available at https://www.amazon.com/gp/customer-reviews/ROCCFUOVYD03G?ref=va_cr_lb. (Year: 2015).*

YouTube video titled "What Is A Ranger Band and How Do You Use Them?" by Hiram Cook, published on Jun. 27, 2013, and available at https://www.youtube.com/watch?v=i8XvhWEyKhc. (Year: 2013).*

YouTube video titled "How to mount a flashlight to your handlebars" by I Ride Fix3d, published on Jul. 3, 2016, and available at https://www.youtube.com/watch?v=Y_alP99T_Ro. (Year: 2016).*

\* cited by examiner

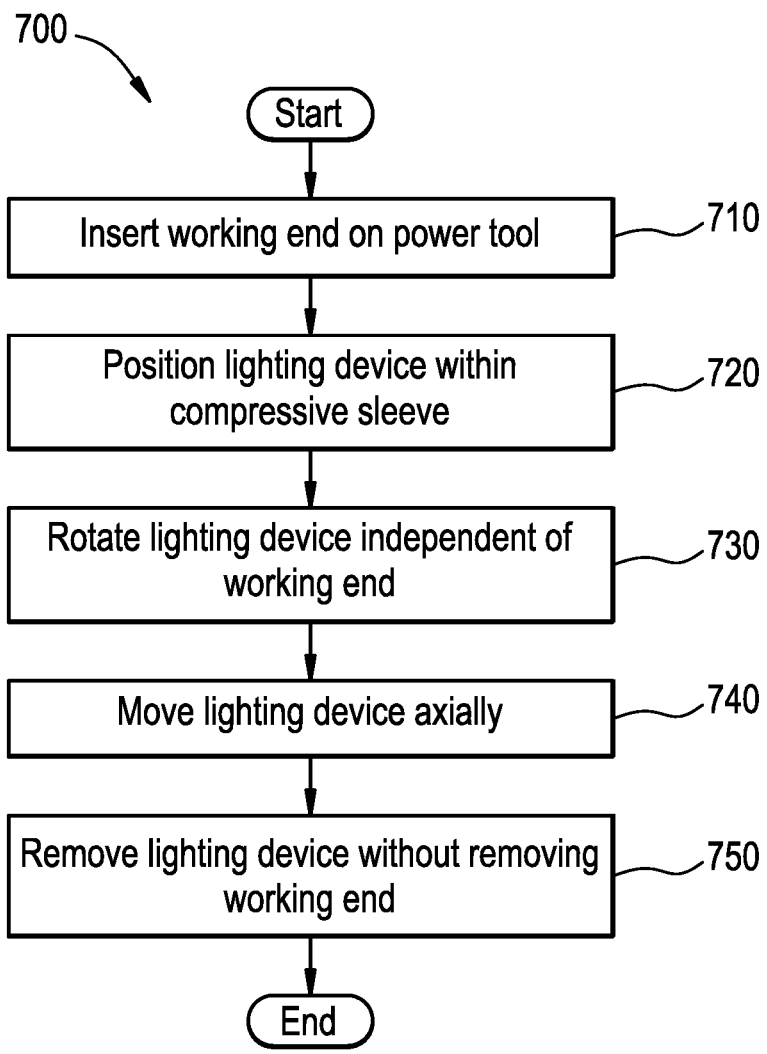

SYSTEMS AND METHODS FOR A DETACHABLE LIGHTING ACCESSORY FOR A POWER TOOL

BACKGROUND INFORMATION

Field of the Disclosure

Examples of the present disclosure are related to systems and methods for a detachable lighting accessory for a power tool. More particularly, embodiments relate to a lighting attachment that is configured to be removable inserted into a compression sleeve, wherein the lighting attachment may be inserted without removing a working end of the power tool.

Background

Die grinders and rotary tools are handheld power tools used for grinding, sanding, honing, polishing, or machining materials. Die grinders and other power tools are often used in a variety of conditions, such well-lit indoor work spaces, outdoor construction sites, piping with low visibility, and other areas that are not always well lit. Consequently, a tool operator must work under poor lighting conditions, which may hinder the operator from satisfactorily completing a job.

Conventionally, to provide lighting to a work space, tool operators may set up an additional light source such as a lamp, tape a light source such as a flashlight to the power tool, or ask a second person to hold a light source. However, these methods may not adequately provide lighting on an area of interest where the work is being performed.

Further, some conventional power tools may include a light source permanently coupled to the power tool. In these conventional systems, the light source may not be removed from the power tool and are fixed in place. Accordingly, the operator of the power tool may not be able to change an area of interest or light pattern created by the light source on conventional power tools Accordingly, needs exist for more effective and efficient systems and methods for a power tool with a removable lighting accessor that is configured to be inserted into a compression sleeve, wherein the lighting attachment may be inserted and rotated without removing a working end of the power tool.

SUMMARY

Embodiments disclosed herein describe systems and methods for a power tool with a removable lighting accessor that is configured to be inserted into a compression sleeve, wherein the lighting attachment may be inserted and rotated without removing a working end of the power tool.

Embodiments may include a power tool, a compressive sleeve, and a lighting device.

The power tool may be any type of hand operated tool that includes a handle, shaft, and a working end. For example, the power tool may be a die grinder, rotary tool, sander, screwdriver, etc. The handle of the power tool may be positioned proximate to a first end of the power tool, and the working end may be positioned proximate to a second end of the power tool.

The handle may be configured to receive a hand of an operator of the power tool to allow the operator too firmly and accurately position the working end of the power tool. The shaft may be positioned between the handle and the working end, wherein the shaft may be configured to receive a second hand of the operator of the power tool.

The working end of the power tool may include a drill bit, end mill, head, etc. that is configured to rotate about a central axis of the power tool.

The compressive sleeve may be may be configured to wrap around the shaft of the power tool. The compressive sleeve may have a variable inner diameter that is configured to increase in size responsive to receiving pressure, and retract in size to fir tightly around an object positioned within the inner diameter. The compressive sleeve may be configured to apply compressive forces towards a central axis of the compressive sleeve.

The lighting device may be configured to emit light on an area of interest positioned in front of the working end of the power tool. In embodiments, the lighting device may be configured to be manually rotated about the shaft to change a light pattern emitted by the lighting device. The lighting device may include a lighting sources, body, cutout, and projection.

The lighting sources may be configured to emit light on an area of interest around the working end. The lighting sources may be positioned on a front face of the body. In embodiments, the lighting sources may be evenly spaced apart from each other. For example, the lighting sources may be positioned one hundred twenty degrees apart from each other when there are three lighting sources, ninety degreed apart from each other when there are four lighting sources, etc. This may enable lighting sources to uniformly distribute light to an area in front of the working end.

The body may be configured to house the lighting sources, such that the lighting sources are positioned on a front face of the body. In embodiments, the body may be angled, such that a width of a lower end of the body may be smaller than a width of the upper end of the body. This may enable the lights positioned on the front face of the body to emit light at different angles in front of the working end. In embodiments, the body of the lighting device may be configured to rotate while the working end of the power tool is rotating.

The cutout may be a hole, passageway, opening, etc. positioned through the body. The cutout may extend from an outer diameter of the body towards the inner diameter of the body. The cutout may allow the lighting device to be positioned between the shaft and the working end of the power tool without removing the drill bit of the working end. More specifically, the cutout may allow the lighting device to be positioned around the shaft, and then position the compressive sleeve over an end of the body, without removing the working end. Furthermore, the cutout may include flared, tapered, angled, edges. This may enable the lighting device to be coupled to various sizes shafts of a power tool.

The projection may extend away from the body of the lighting device. The projection may be configured to be inserted into the compression sleeve to hold the lighting device in place. In embodiments, the projection may have a smaller radius than that of the body. Further, the projection may have a longer length than that of the body. This may enable the lighting device to slide axially along the central axis of the power tool to change a light pattern emitted by the lighting sources.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7 depicts a method for operating a lighting device, according to an embodiment.

Figure 1:
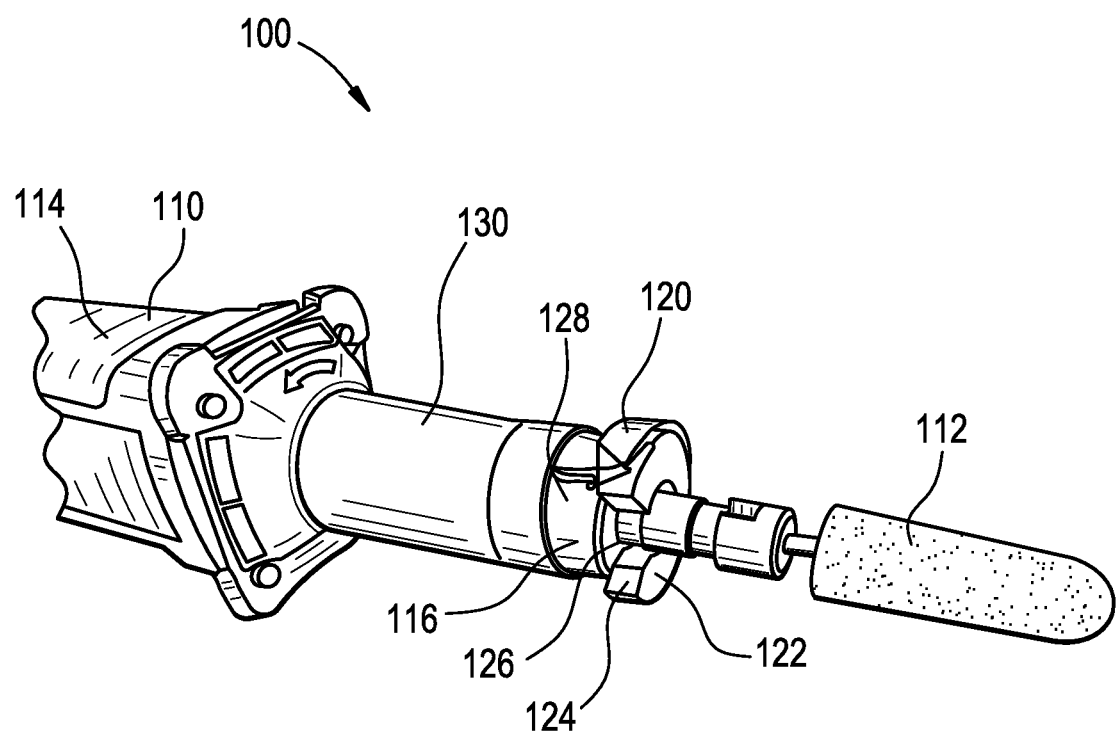
FIG. 1 depicts a power tool lighting system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a power tool with a removable lighting accessor that is configured to be inserted into a compression sleeve, wherein the lighting attachment may be inserted and rotated without removing a working end of the power tool.

FIG. 1 depicts a system 100 configured to emit light on an area of interest in front of a power tool 110, according to an embodiment. System 100 may include power tool 110 and lighting device 120.

Power tool 110 may be any type of hand operated tool that includes a handle 114, working end 112, and shaft 116. For example, the power tool 110 may be a die grinder, rotary tool, sander, screwdriver, etc.

Handle 114 may be positioned on a first end of power tool 110. Handle 114 may be configured to receive and house components of power tool 110, and to provide a support for an operator of power tool 110.

Working end 112 may be positioned on a second end of power tool 110. Working end may be include a drill bit, end mill, heat, etc. that is configured to rotate about a central axis of power tool 110. In embodiments, working end 112 may have a greater or smaller diameter than that of shaft 116.

Shaft 116 may be configured to be positioned between handle 114 and working end 112. Shaft 112 may be configured an actuator that supplies power to rotate working end 112. Shaft 116 may also be configured to operate as a handle to receive a second hand of an operator of power tool 110.

Compressive sleeve 130 may be a device that is configured to wrap around shaft 116, and provide a compressive force against an outer circumference of shaft 116. Compressive sleeve 130 may have a variable diameter that is configured to expand and/or retract responsive to an inner circumference of compressive sleeve 130 receiving pressure. Compressive sleeve 130 may apply compressive forces towards a central axis of compressive sleeve 130.

Lighting device 120 may be configured to emit light on an area of interest positioned in front of the working end 112 of the power tool 110. In embodiments, the lighting device may be configured to be manually rotated about shaft 130 to change a light pattern emitted by the lighting device 120. The lighting device may include a lighting sources 122, body 124, cutout 126, and projection 128.

Lighting sources 122 may be configured to emit light on an area of interest around the working end. Lighting sources 122 may be positioned on a front face of body 124. In embodiments, lighting sources 122 may be evenly spaced apart from each other. For example, lighting sources 122 may be positioned one hundred twenty degrees apart from each other when there are three lighting sources, ninety degreed apart from each other when there are four lighting sources, etc. This may enable lighting sources 122 to uniformly distribute light to an area in front of the working end 112.

The body 124 may be configured to house the lighting sources 122, such that the lighting sources are positioned on a front face of body 124. Front face of body 124 may have a greater diameter than that of working end 112 and shaft 116. This may enable lighting sources 122 positioned on the front face of body 124 to be positioned further away from the central axis of power tool 110 than working end 112. In embodiments, the front face of body 124 may be angled, such that a width of a lower end of body 124 may be smaller than a width of the upper end of body 124. This may enable the lighting sources 122 positioned on the front face of body 124 to emit light at different angles in front of working end 112.

Cutout 126 may be a hole, passageway, opening, etc. positioned through the body 124. Cutout 126 may extend from an outer diameter of body 124 towards the inner diameter of body 124 Cutout 126 may allow lighting device 120 to be positioned between shaft 116 and working end 112 of the power tool 110 without removing working end 112. This may be especially advantages when dealing with a working end 112 that is larger than lighting device 120. Furthermore, cutout 126 may include flared, tapered, angled, edges. This may enable the lighting device 120 to be coupled to various sizes shafts 116 of a power tool 110.

Projection 128 may extend away from body 124 of lighting device 120. Projection 128 may be configured to be inserted into the compression sleeve to hold lighting device 120 in place. In embodiments, projection 128 may have a smaller radius than that of body 124. Further, projection 128 may have a longer length than that of the body 124. This may enable lighting device 120 to slide axially along the central axis of power tool 110 to change a light pattern emitted by the lighting sources 122.

Figure 2:
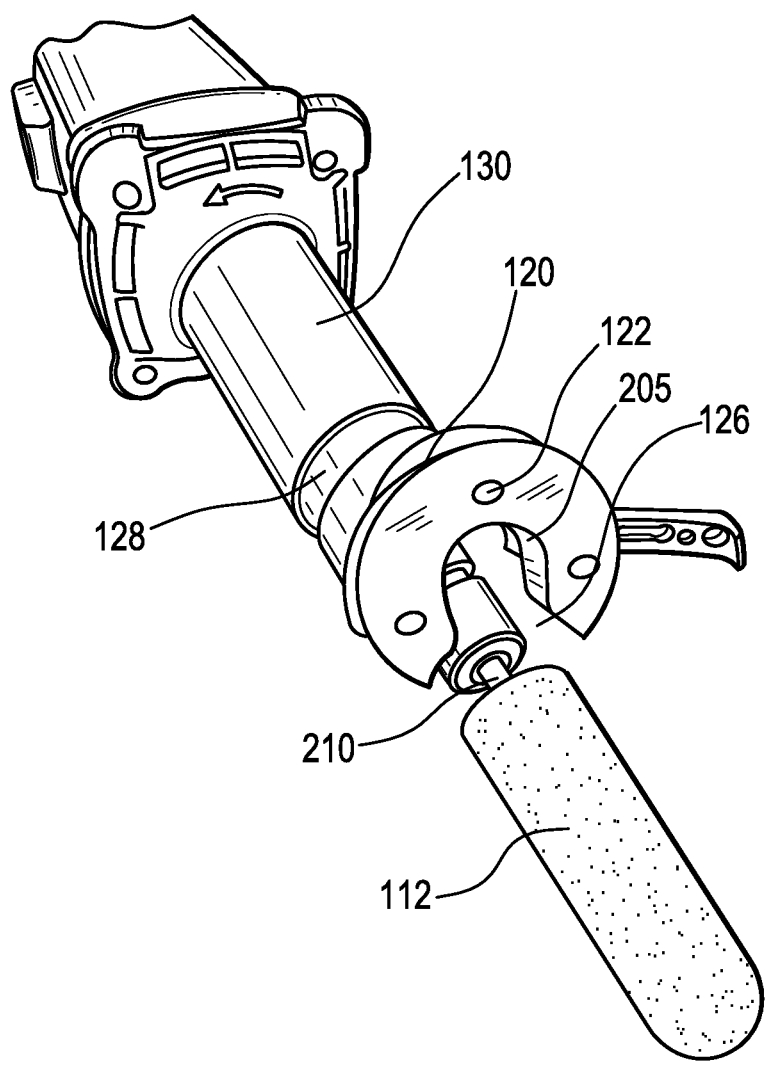
FIG. 2 depicts a power tool lighting system, according to an embodiment.

FIG. 2 depicts system 100, according to an embodiment. Elements depicted in FIG. 2 may be described above, and for the sake of brevity a further description of these elements may be omitted.

As depicted in FIG. 2, lighting device 120 may be initially positioned away from a central axis of power toll 110. The may enable lighting device 120 to be inserted compression sleeve 130 without removing working end 112. Furthermore, based on the internal diameter of cutout 126, lighting device 120 may not be automatically rotated by the actuator 210 that rotated working end 112. More specifically, the inner diameter of cutout 205 may be positioned around actuator 210, without touching actuator 210.

Figure 3:
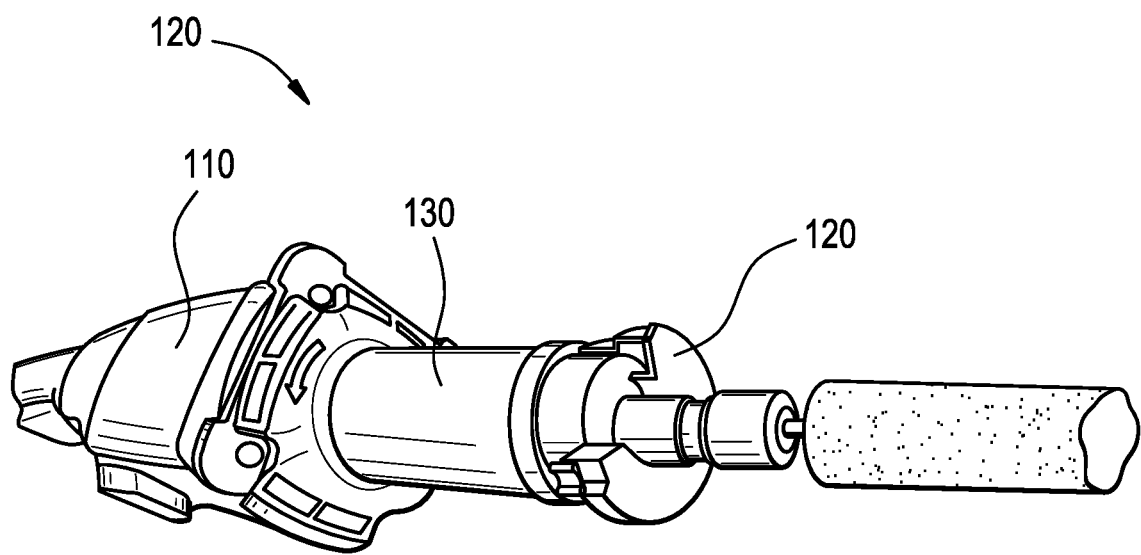
FIG. 3 depicts a power tool lighting system, according to an embodiment.

FIG. 3 depicts system 100, according to an embodiment. Elements depicted in FIG. 3 may be described above, and for the sake of brevity a further description of these elements may be omitted.

As depicted in FIG. 3, lighting device 120 may be rotated manually, which may occur while working end 112 is rotating or stationary. This may allow for the independent rotation of lighting device 120 with respect to working end 112 and power tool 110.

Figure 4:
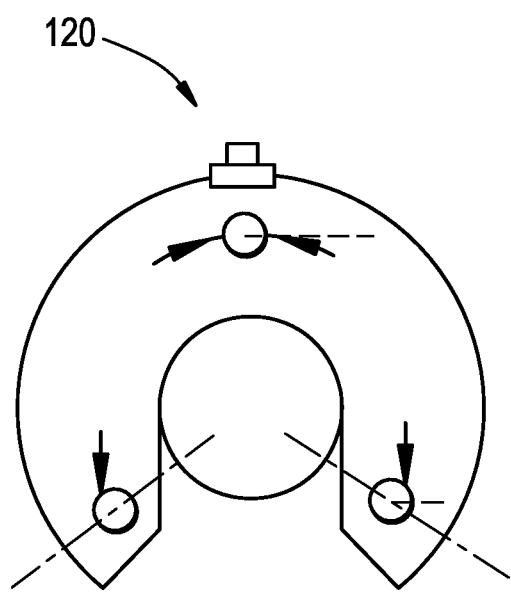
FIGS. 4-6 depicts a lighting device, according to an embodiment.
Figure 5:
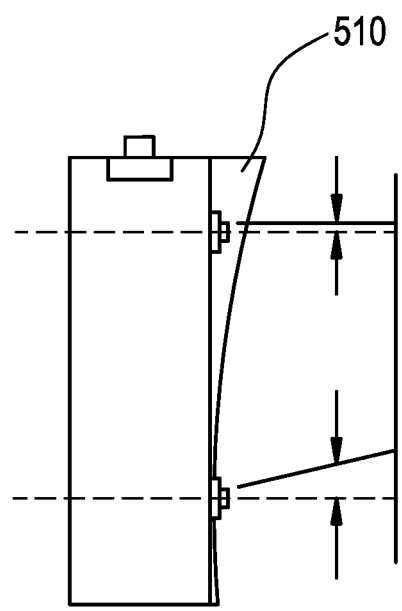
Figure 6:
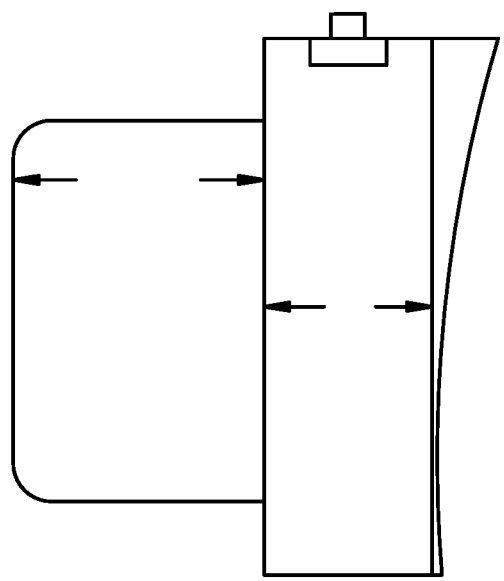

FIGS. 4-6 depicts lighting device 120, according to an embodiment. Elements depicted in FIGS. 4-6 may be described above, and for the sake of brevity a further description of these elements may be omitted.

As depicted in FIGS. 4-6, a front face 510 of lighting device 120 may be angled, such that an upper edge of lighting device 120 has a longer width than that of a lower edge of lighting device 120. This may enable the lights positioned on front face 120 to emit light at different angles. This may be advantageous when working within a pipe or with working ends of different sizes, wherein varying a light pattern may enable a different area of interest to receive the light.

FIG. 7 depicts a method 700 for operating a lighting device, according to an embodiment. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

At operation 710, a working end of a power tool may be coupled to an actuator of the power tool.

At operation 720, a lighting device may be coupled around the actuator of the power tool without removing the working end. Further, the lighting device may be inserted into a compressive sleeve to hold the lighting device in place. The lighting device may be positioned between a handle of the power tool and the working end.

At operation 730, the lighting device may be rotated independently from the actuator and the power tool. The rotation of the lighting device may enable a different light pattern to be emitted onto an area of interest.

At operation 740, the lighting device may be moved axially along the power tool. This may allow a distance from a front face of the lighting device to the working end to change.

At operation 750, the lighting device may be removed from the power tool without removing the working end.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s).

What is claimed is:

1. A lighting system for a power tool comprising:
   lighting sources configured to emit light on an area of interest in front of a working end of the power tool;
   a cutout extending from a proximal end to a distal end of a body with an annulus, wherein the lighting sources are positioned on a first face on the distal end of the body, the cutout having angled sidewalls extending from an outer circumference of the annulus to an inner circumference of the annulus, wherein a first distance across first ends of the angled sidewalls aligned with the inner circumference is smaller than a second distance across second ends of the angled sidewalls aligned with the outer circumference, wherein the inner circumference of the annulus is configured to be positioned adjacent to a shaft of the power tool;
   a projection extending away from the proximal end of the body, the projection having a first diameter and the body having a second diameter, the second diameter being larger than the first diameter;
   a compressive sleeve being configured to be positioned on the shaft of the power tool, the shaft being positioned between a handle and the working end of the power tool, wherein the projection is configured to be inserted between the an inner circumference of the compressive sleeve and an outer circumference of the shaft.

2. The lighting system of claim 1, wherein the cutout is configured to be positioned around the shaft without removing the working end of the power tool, the working end of the power tool including a drill bit.

3. The system of claim 1, wherein the projection has a first length and the body has a second length, the first length being longer than the second length.

4. The system of claim 1, wherein the projection and the body are configured to move along a linear direction in parallel to a central axis of the shaft while the working end is operating to change a light pattern on the area on interest.

5. The lighting system of claim 1, wherein the first face is angled.

6. The lighting system of claim 5, wherein a lower edge of the first face has a width that is longer than a second edge of the first face.

7. The lighting system of claim 1, wherein the body is configured to be manually rotated around the shaft in two rotational directions while the working end is rotating.

* * * * *